United States Patent
Garward et al.

(10) Patent No.: US 8,032,521 B2
(45) Date of Patent: Oct. 4, 2011

(54) MANAGING STRUCTURED CONTENT STORED AS A BINARY LARGE OBJECT (BLOB)

(75) Inventors: Stephen J. Garward, Sydney (AU);
Mark C. Hampton, Newtown (AU);
Eric Martinez de Morentin, Manly (AU); Kenneth Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/835,825

(22) Filed: Aug. 8, 2007

(65) Prior Publication Data

US 2009/0043785 A1      Feb. 12, 2009

(51) Int. Cl.
*G06F 17/30* (2006.01)

(52) U.S. Cl. ........ 707/715; 707/609; 707/696; 707/637; 707/711; 707/793; 707/739; 707/740; 707/741; 707/742; 707/743; 707/744; 707/745; 707/746; 707/802; 707/803

(58) Field of Classification Search .................. 707/637, 707/609, 696, 711, 715, 739–746, 793, 802–803
See application file for complete search history.

(56) References Cited

U.S. PATENT DOCUMENTS

| | | | | |
|---|---|---|---|---|
| 7,043,488 | B1 * | 5/2006 | Baer et al. | 707/101 |
| 7,698,258 | B2 * | 4/2010 | Hoffman et al. | 707/999.003 |
| 7,814,129 | B2 * | 10/2010 | Williams | 707/812 |
| 2005/0071349 | A1 * | 3/2005 | Jordan et al. | 707/100 |
| 2006/0071349 | A1 * | 4/2006 | Tokushige et al. | 257/784 |
| 2006/0195431 | A1 * | 8/2006 | Holzgrafe et al. | 707/3 |

* cited by examiner

*Primary Examiner* — Frantz Coby
(74) *Attorney, Agent, or Firm* — Steven M. Greenberg, Esq.; Carey, Rodriquez, Greenberg & Paul

(57) ABSTRACT

Embodiments of the present invention address deficiencies of the art in respect to structured content storage and provide a novel and non-obvious method, system and computer program product for managing structured content stored in a BLOB. In an embodiment of the invention, a performance optimized structured content management system can include a content repository, a content manager configured to provide access to structured content in the content repository and multiple different performance optimized containers disposed in the content repository. Each of the containers can store a portion of the structured content, and each of the containers can include a flattened form of original structured content in a primary binary large object (BLOB) and a parsed form of the original structured content in a secondary BLOB, the parsed form of the original structured content in the secondary BLOB indexing the flattened form of the original structured content in the primary BLOB.

12 Claims, 2 Drawing Sheets

MANAGING STRUCTURED CONTENT STORED AS A BINARY LARGE OBJECT (BLOB)

BACKGROUND OF THE INVENTION

1. Field of the Invention

The present invention relates to the field of structured representation of content and more structured content storage and management.

2. Description of the Related Art

Structured content is content in which the organizational hierarchy of information has been identified in a systematic and consistent manner. The structure of content can be important because the structure unifies content, irrespective of the author. The structure of content can be defined in a model and supported by a document type definition or schema in order to guide the author through the content creation process. Thus, structured content provides a means of separating content from presentation, and structured content can provide a predictable way of storing information based on a predefined set of rules. As such, structured content can be readily transformed into any other structured or unstructured format.

Inherently structured content is often represented as an extensible markup language (XML) document and is often associated with content management systems. In addition to being structured, structured content embodied within an XML document can contain some presentational markup, especially that which applies stylistic control to the material. In consequence, structured content frequently is used in conjunction with Web page templates where a site has a significant amount of common presentation for a large amount of material. Examples include sites that provide news services where each article in the site uses the same general layout and follows the same general form; however, the content for each article is unique. By holding the articles as structured content, the same page templates can be used for hundreds of different articles.

Notably, a content repository or database is not required to utilize an XML representation of structured content. However, a content repository makes it possible to manage content modules, which allows one to search content by elements and attribute, to locate content created by a specific author, to locate content by topic, to identify content chunks that are being used in multiple locations and to extract chunks that match certain criteria. To that end, XML works well with content repositories because as a text format, it is easier to manage than proprietary binary formats. Finally, when stored in a content repository, structured content can be automatically chunked at specified element levels, which makes content reuse easier In particular, structured content can be parsed and stored as separate rows or nodes in a content repository in order to support database management system-like features including indexing fragments within structured content and establishing and maintaining the referential integrity of fragments within structured content. Even still, storing structured content as separate rows or nodes in a content repository can be processor intensive. Consequently, storing structured content as separate rows or nodes in a content repository can be expensive in terms of the amount of time necessary to store and retrieve requested content.

BRIEF SUMMARY OF THE INVENTION

Embodiments of the present invention address deficiencies of the art in respect to structured content storage and provide a novel and non-obvious method, system and computer program product for managing structured content stored in a BLOB. In an embodiment of the invention, a performance optimized structured content management system can include a content repository, a content manager configured to provide access to structured content in the content repository and multiple different performance optimized containers disposed in the content repository. Each of the containers can store a portion of the structured content, and each of the containers can include a flattened form of original structured content in a primary binary large object (BLOB) and a parsed form of the original structured content in a secondary BLOB, the parsed form of the original structured content in the secondary BLOB indexing the flattened form of the original structured content in the primary BLOB.

In one aspect of the embodiment, each of the performance optimized containers further can include parsed key strings from the secondary BLOB. In this way, the parsed key strings can provide access to key fragments in the original structured content in the primary BLOB. In another aspect of the embodiment, each of the performance optimized containers further can include nodal references separately stored from the BLOBs. The nodal references can refer to other nodes in the original structured content. As such, the content manager can perform referential integrity to prohibit deletion of a fragment associated with a referenced node in the nodal references. Finally, in yet another aspect of the embodiment, each of the performance optimized containers further can include separately stored attachments extracted from the original structured content.

In another embodiment of the invention, a method for performance optimized structured content storage can be provided. The method can include receiving a request to store original structured content in a content repository. Thereafter, the original structured content can be flattened into a primary BLOB, and the original structured content can be indexed into a parsed form of the original structured content stored in a secondary BLOB. Both BLOBs can be stored in a container in the content repository. Finally, indexed access to the flattened form of the original structured content in the primary BLOB can be provided through the parsed form of the original structured content stored in the secondary BLOB.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing structured content stored in a BLOB. In accordance with an embodiment of the present invention, original structured content can be submitted for storage in a content repository. The original structured content can be indexed into a parsed form of the original structured content and each of the original structured content and the parsed form of the structured content can be flattened into respective BLOBs. Both of the BLOBs can be stored in a single container for the content repository. Also, key strings in the parsed form of the structured content can be copied into a separate storage element in the container as can nodal references to nodes in the structured content. Finally, attachments for the submitted content can be removed, compressed and copied into the container.

Each container stored in the content repository can be accessed through indexed operations. Specifically, the parsed form of the structured content in the BLOB can be queried. Optionally, the key string data further can be queried. Access operations affecting references to other nodes in the structured content can be moderated according to the separately stored nodal references in the container to ensure referential integrity. Yet, a complete, unmodified form of the structured content in the BLOB can be maintained in the container for subsequent manipulation if need be. In this way, the structured content can be accessed through the container by index and referential integrity can be maintained for the nodal references during access operations without invoking the performance penalty of a multi-nodal representation of the structure content.

Figure 1:
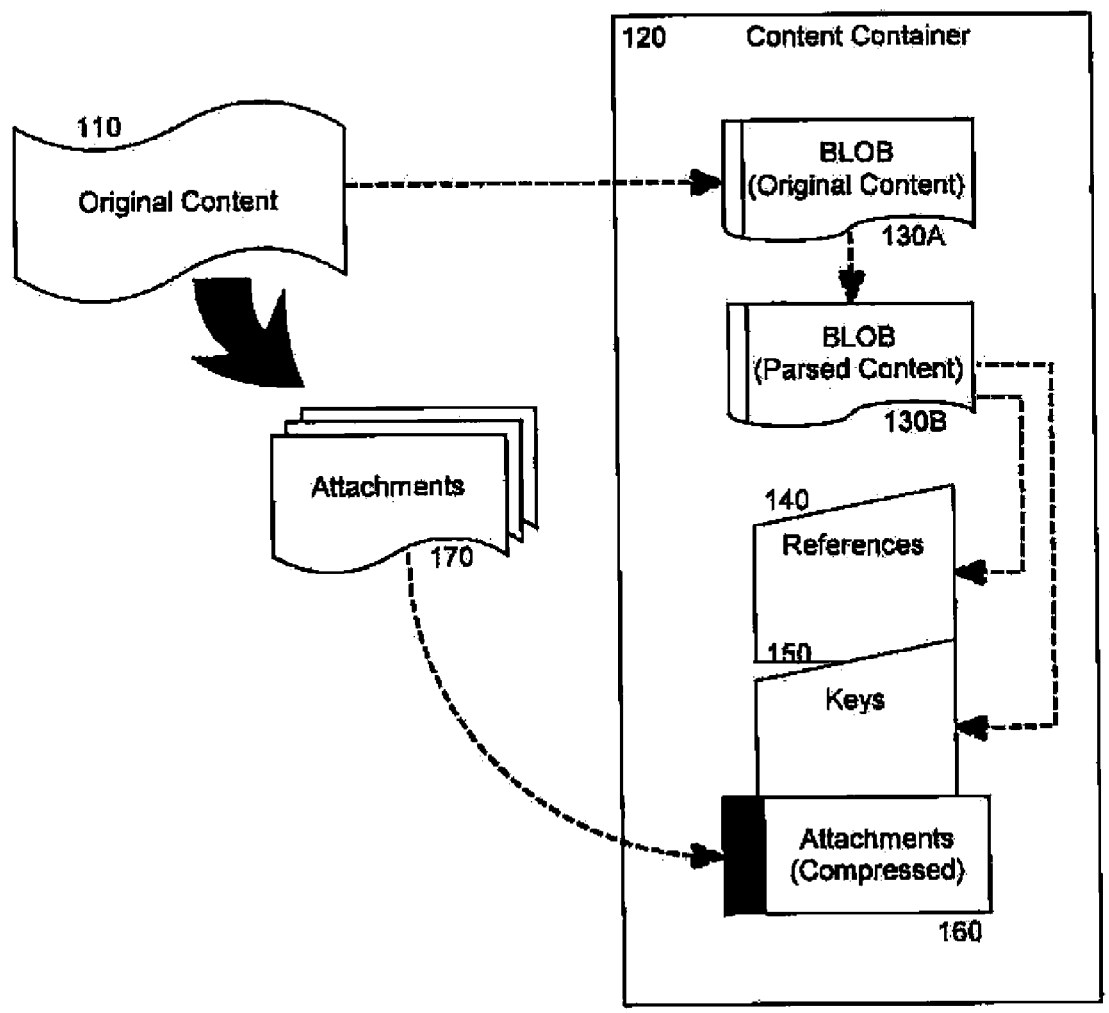
FIG. 1 is a pictorial illustration of a content repository configured for managing structured content stored in a BLOB.

In further illustration, FIG. 1 is a pictorial illustration of a content repository configured for managing structured content stored in a BLOB. The content repository can include different content containers 120, each corresponding to original structured content 110. Each content container 120 can include a flattened form of the original structured content 110 as a BLOB 130A. Each content container 120 further can include a parsed form of the original structured content 110 as a BLOB 130B so as to provide indexed access to the flattened form of the original structured content 110 in BLOB 130A. Also, attachments for the original content 110 can be extracted from the original content and separately stored in the container 120, optionally in compressed form.

Nodal references 140 to other nodes in the parsed form of the structured content 110 in the BLOB 110 can be extracted and separately stored in the container 120. Likewise, different key strings 150 in the parsed form of the original structured content 110 in the BLOB 130B can be separately stored in the container 120. In this way, the container 120 can support indexed access to key strings in the flattened form of the original structured content 110 in the BLOB 130A through the operation of the parsed form of the original structured content 110 in the BLOB 130B in combination with the key strings 150. Additionally, referential integrity can be maintained amongst the nodes of the original content by accounting for the references 140 separately from the flattened form of the original structured content 110 in the BLOB 130A.

Figure 2:
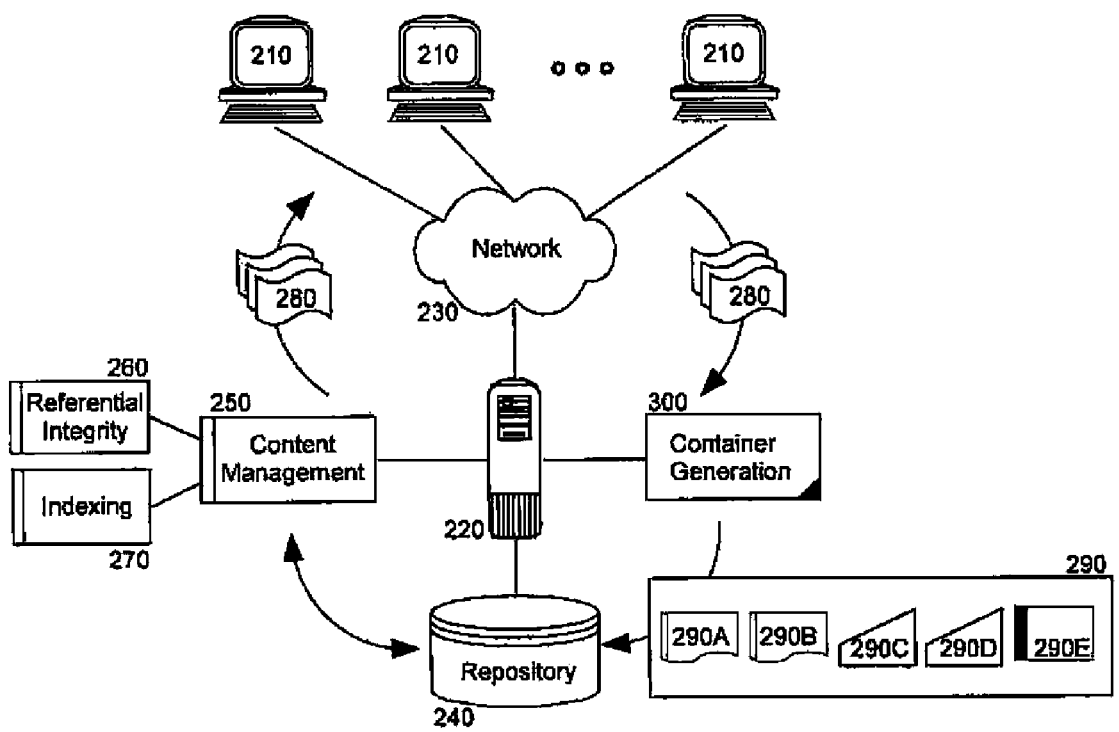
FIG. 2 is a schematic illustration of a structured content storage data processing system configured for managing structured content stored in a BLOB; and, FIG. 3 is a flow chart illustrating a process for managing structured content stored in a BLOB.

A content repository incorporating the content container 120 can be disposed in a structured content storage data processing system. In illustration, FIG. 2 schematically depicts a structured content storage data processing system configured for managing structured content stored in a BLOB. The system can include a host content repository server 220 configured for communicative coupling to one or more clients 210 over computer communications network 230. The host content server 240 can be further configured to support a coupled content repository 240 to store content at the behest of clients 210 and to provide access to content also at the behest of clients 210.

Content generation logic 300 can be coupled to the content repository 240 through host content server 240. The logic 300 can include program code enabled to receive structured content 280 from clients 210 and to transform the structured content 280 into a performance optimized container 290 for storage in the content repository 240. In this regard, the performance optimized container 290 can include a flatted form of the structured content 280 stored in a BLOB 290A, a parsed form of the structured content 280 stored in another BLOB 290B, nodal references 290C extracted from the parsed form of the structured content 280, key strings 290D also extracted from the parsed form of the structured content 280, and attachments 290E removed from the structured content 280.

Access to the performance optimized container 290 can be mediated by content manager 250. The content manager 250 can include both a referential integrity module 260 and an indexing module 270. The indexing module 270 can be configured to provided indexed access to the data in the flattened form of the structured content 280 stored in the BLOB 290A through the operation of the parsed form of the structured content 280 in the BLOB 290B in combination with the key strings 290C. The referential integrity module 260, in turn, can maintain referential integrity between nodes in the flattened form of the structured content 280 in the BLOB 290A by referring to and managing the nodal references 290D.

Figure 3:
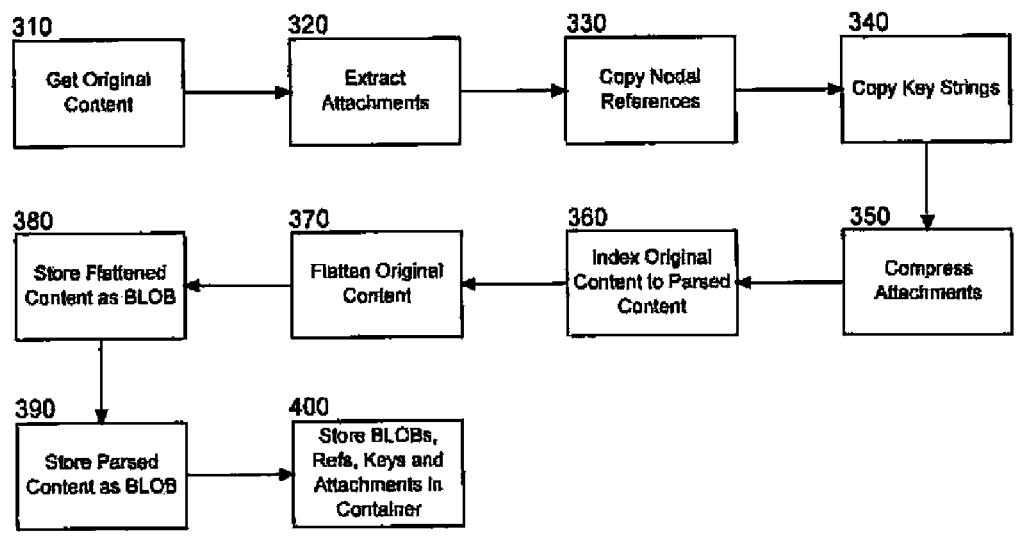

In this way, the advantages of indexing and referential integrity ordinarily associated with multi-nodal or multi-row hierarchical representations of structured content can be achieved herein without incurring associated performance penalties. In yet further illustration of the generation of the performance optimized container 290, FIG. 3 is a flow chart illustrating a process for managing structured content stored in a BLOB. Beginning in block 310, original structured content can be received for storage in the content repository. In block 320, any attachments to the structured content, can be extracted from the original structured content and in block 330, nodal references (e.g. references to other nodes in the original structured content) can be parsed out of the original content as can key strings in block 340.

In block 350, the extracted attachments can be compressed for storage in the performance optimized container and in block 360 the original content can be indexed into parsed content. In block 370, the original structured content can be flattened by recursively aggregating the children of all nodes into a single serial data structure. Thereafter, in block 380 the flattened form of the original structured content can be stored in a BLOB. Likewise, the parsed form of the structured content can be stored in a different BLOB. Finally, both BLOBs along with the nodal references, key strings and attachments can be stored in the performance optimized container.

The structure of the performance optimized container provides inherent performance advantages in structured content processing. First, performance enhanced storage and retrieval can be provided as fewer rows or nodes are required to create and to read data from the structured content. Second, the integrity of the original structured content can be maintained for future editing. Third, the integrity of full text search indexing can be provided as the original structured content is indexed for accurate search results. Fourth, easy management of referenced binaries can be provided as attachments are stored as a compressed archive in order to simplify the management of the lifecycle of the binaries.

Yet further, referential integrity for referenced nodes can be maintained as items referenced from inside the BLOB cannot be deleted. Also, key data can be queried from within the source by parsing the source content for key strings of data, including metadata and hyperlinks. Consequently, queryability can be maintained even though the content is stored as a BLOB. Finally, quick access to fragments via storage of a pre-parsed version can be provided. In particular, by storing a pre-parsed copy of the original structured content, key fragment manipulation can be facilitated by locating within the original structured content.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A performance optimized structured content management system comprising:
   a host content repository server;
   a content repository;
   a content manager executing in the host content repository server and configured to provide access to structured content in the content repository; and,
   a plurality of performance optimized containers disposed in the content repository, each of the containers storing a portion of the structured content, each of the containers comprising a flattened form of original structured content in a primary binary large object (BLOB) and a parsed form of the original structured content in a secondary BLOB, the parsed form of the original structured content in the secondary BLOB providing an index to the flattened form of the original structured content in the primary BLOB.

2. The system of claim 1, wherein each of the performance optimized containers further comprises parsed key strings from the secondary BLOB, the parsed key strings providing access to key fragments in the original structured content in the primary BLOB.

3. The system of claim 1, wherein each of the performance optimized containers further comprises a plurality of nodal references separately stored from the BLOBs, the nodal references referring to other nodes in the original structured content, the content manager performing referential integrity to prohibit deletion of a fragment associated with a referenced node in the nodal references.

4. The system of claim 1, wherein each of the performance optimized containers further comprises separately stored attachments extracted from the original structured content.

5. A method for performance optimized structured content storage comprising:
   receiving a request to store original structured content in a content repository executing in memory by a processor of a host content server;
   flattening the original structured content into a primary binary large object (BLOB);
   indexing the original structured content into a parsed form of the original structured content stored in a secondary BLOB;
   storing both BLOBs in a container in the content repository; and,
   providing indexed access to the flattened form of the original structured content in the primary BLOB through the parsed form of the original structured content stored in the secondary BLOB.

6. The method of claim 5, further comprising separately storing parsed key strings from the secondary BLOB in the container.

7. The method of claim 5, further comprising:
   copying nodal references from the original structured content, the nodal references referring to nodes in the original structured content;
   storing the nodal references in the container; and,
   prohibiting a deletion of data in the flattened form of original structured content in the primary BLOB referenced according to the nodal references.

8. The method of claim 5, further comprising:
   extracting attachments from the original structured content;
   compressing the attachments; and,
   separately storing the compressed attachments in the container.

9. A computer program product comprising a computer usable storage medium storing computer usable program code for performance optimized structured content storage, the computer program product comprising:
   computer usable program code for receiving a request to store original structured content in a content repository;
   computer usable program code for flattening the original structured content into a primary binary large object (BLOB); computer usable program code for indexing the original structured content into a parsed form of the original structured content stored in a secondary BLOB;

computer usable program code for storing both BLOBs in a container in the content repository; and, computer usable program code for providing indexed access to the flattened form of the original structured content in the primary BLOB through the parsed form of the original structured content stored in the secondary BLOB.

10. The computer program product of claim 9, further comprising computer usable program code for separately storing parsed key strings from the secondary BLOB in the container.

11. The computer program product of claim 9, further comprising:

computer usable program code for copying nodal references from the original structured content, the nodal references referring to nodes in the original structured content;

computer usable program code for storing the nodal references in the container; and, computer usable program code for prohibiting a deletion of data in the flattened form of original structured content in the primary BLOB referenced according to the nodal references.

12. The computer program product of claim 9, further comprising:

computer usable program code for extracting attachments from the original structured content;

computer usable program code for compressing the attachments; and, computer usable program code for separately storing the compressed attachments in the container.

* * * * *